United States Patent [11] 3,593,635

| [72] | Inventor | Harold J. Servetnick<br>1002 Ripley St., Philadelphia, Pa. 19111 |
|---|---|---|
| [21] | Appl. No. | 778,501 |
| [22] | Filed | Nov. 25, 1968 |
| [45] | Patented | July 20, 1971 |

[54] FILM CARTRIDGE
6 Claims, 10 Drawing Figs.

[52] U.S. Cl. .................................................... 95/31R,
206/52 F, 206/59 E, 242/71.2
[51] Int. Cl. ........................................................ G03b 19/04
[50] Field of Search.......................................... 95/31;
206/52, 52 F, 59 E; 242/71.2

[56] References Cited
UNITED STATES PATENTS

| 2,218,966 | 10/1940 | Zapp | 242/71.2 |
| 3,151,724 | 10/1964 | Ross | 206/52 X |
| 3,276,714 | 10/1966 | Steisslinger | 206/52 (F) |
| 3,384,318 | 5/1968 | Nerwin | 95/31 (UX) |
| 3,405,797 | 10/1968 | Dwyer | 206/52 |
| 3,432,228 | 3/1969 | Hellmund | 352/137 X |
| 3,476,027 | 11/1969 | Southern | 95/31 X |
| 3,485,157 | 12/1969 | Nerwin | 352/78 X |

FOREIGN PATENTS

| 14,490 | 1/1908 | Great Britain | 242/71.2 |

Primary Examiner—Samuel S. Matthews
Assistant Examiner—Monroe H. Hayes
Attorney—Seidel and Gonda ABSTRACT: A photographic film cartridge for insertion into a camera contains supply and takeup reel housings. A structurally weak area is provided adjacent the takeup reel housing. After the film has been exposed, the takeup reel housing may be separated from the remainder of the cartridge in order to permit more convenient handling and shipping of the exposed film.

PATENTED JUL 20 1971
3,593,635
SHEET 1 OF 2
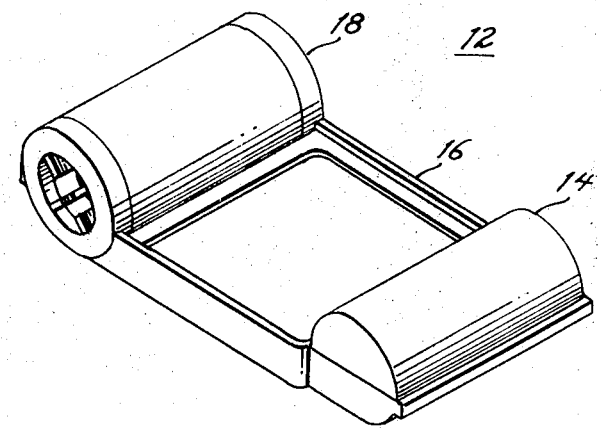
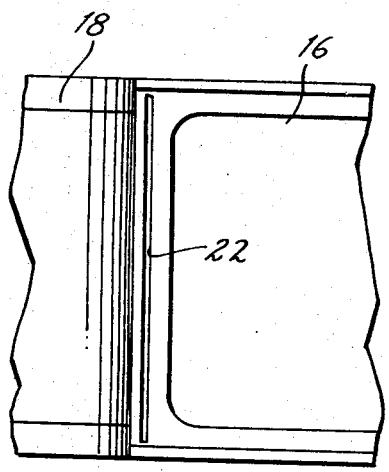
Fig.3.
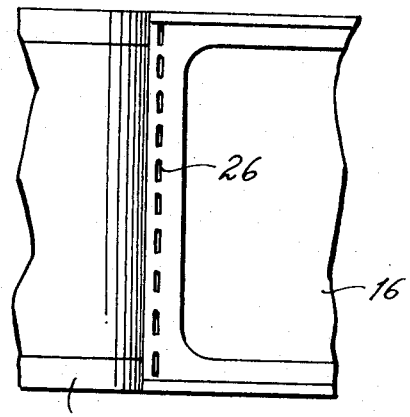
Fig.5.
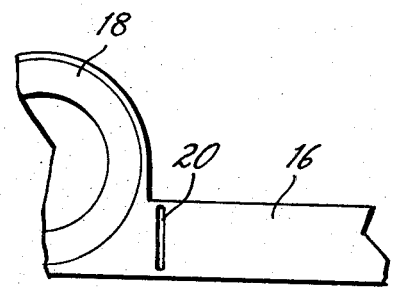
Fig.2.
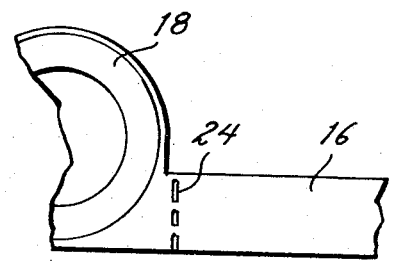
Fig.4.
INVENTOR.
HAROLD J. SERVETNICK
BY
Seidel & Gonda
ATTORNEYS.

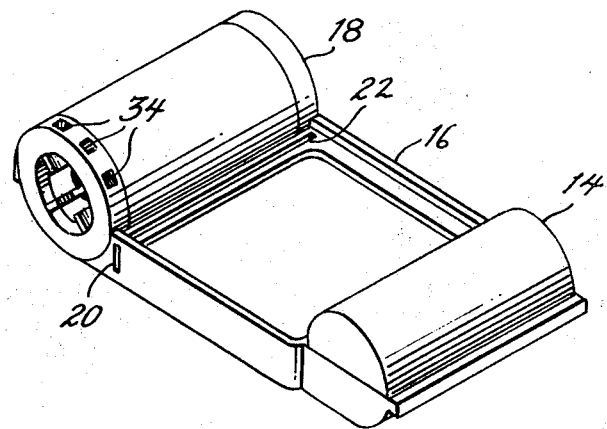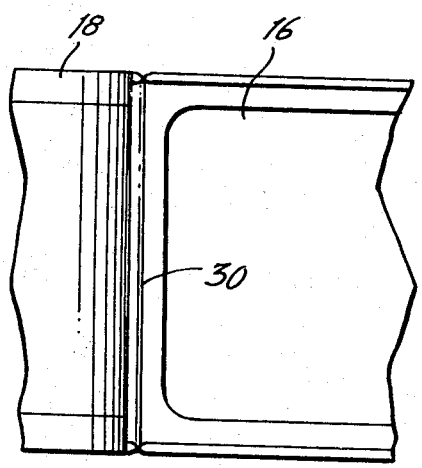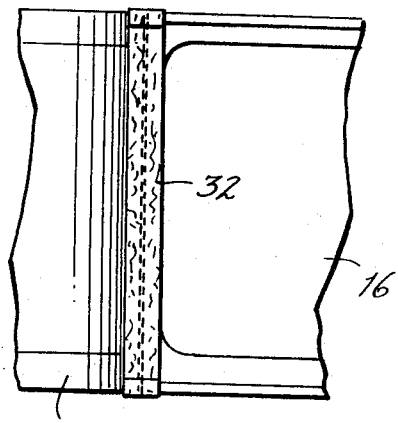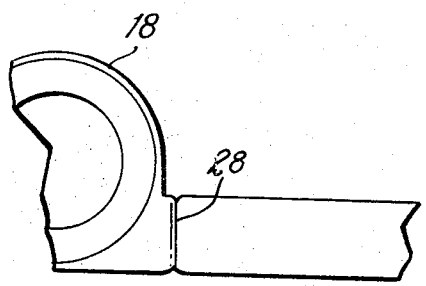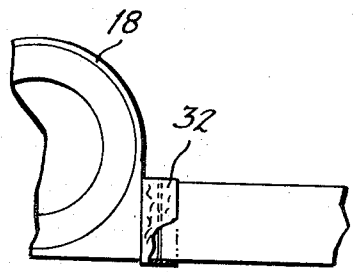

FILM CARTRIDGE

This invention relates to a film cartridge. More particularly, this invention relates to a film cartridge that permits ease of handling and shipping of the exposed film.

Photographic film cartridges are in wide use at the present time. The popularity of these cartridges stems from the fact that the photographer need not bother with the tedious and often messy task of inserting supply and takeup reels and connecting the film therebetween. The photographer need only remove the old cartridge and insert the new one. This procedure is quick, easy to do, and does not soil the fingers of the photographer.

The used cartridge with exposed film therein is usually taken to a photography shop. The photography shop then ships the cartridge to a processing plant for development. Alternatively, the photographer may ship the cartridge directly to the processing plant.

From the time the photographer removes the cartridge until the time the cartridge is broken open to develop the film, the entire cartridge must be handled. In transporting the exposed film to a photography shop, the photographer must carry a bulky cartridge in his pocket. When either the photographer or the photography shop ships the cartridge by mail to the processing plant, special precautions must be made to accommodate the bulkiness of the cartridge.

Accordingly, it is an object of the invention to provide a film cartridge that may be conveniently transported and shipped to a processing plant for development.

It is another object of the invention to provide a film cartridge of improved structure.

Other objects will appear hereinafter.

The film cartridge of the invention achieves the above-mentioned objectives by providing a structural weakness adjacent the takeup reel housing. This weakness enables the takeup reel housing to be separated from the remainder of the cartridge after the film has been exposed. The remainder of the cartridge may be discarded. Since the takeup reel housing, by itself, is small and compact, ease of handling and shipping is achieved.

For the purpose of illustrating the invention, there are shown in the drawings forms which are presently preferred; it being understood, however, that the invention is not limited to the precise arrangements and instrumentalities shown.

FIG. 1 is a perspective view of a conventional film cartridge.

FIG. 2 is a side view of a cartridge of the invention.

FIG. 3 is both a top and bottom view of the cartridge of FIG. 2.

FIG. 4 is a side view of a second embodiment of the cartridge of the invention.

FIG. 5 is both a top and bottom view of the cartridge of FIG. 4.

FIG. 6 is a side view of a third embodiment of the cartridge of the invention.

FIG. 7 is both a top and bottom view of the cartridge of FIG. 6.

FIG. 8 is a side view of a fourth embodiment of the cartridge of the invention.

FIG. 9 is both a top and bottom view of the cartridge of FIG. 8.

FIG. 10 is a perspective view of the cartridge shown in FIGS. 2 and 3.

Referring now to the drawing in detail, wherein like numerals designate like elements, there is shown in FIG. 1 a conventional photographic film cartridge designated as 12. The cartridge is comprised of supply reel housing 14, aperture housing 16, and takeup reel housing 18. Before exposure, all the film is on the supply reel (not shown). After exposure, all the film is on the takeup reel (not shown). During passage of the film from the supply reel to the takeup reel, light passing through an aperture (not shown) in aperture housing 16 is allowed to impinge upon the film. As mentioned above, when the entire film is exposed, cartridge 12 with supply reel housing 14 and takeup reel housing 18 is transported and shipped to a processing plant for development.

FIGS. 2 and 3 show a first embodiment of the cartridge of the invention. Slots 20 are located in the sides of aperture housing 16 adjacent takeup reel housing 18. Slots 22 are similarly placed in the top and bottom of aperture housing 16. Since slots 20 and 22 structurally weaken the junction between aperture housing 16 and takeup reel housing 18, the manual separation of takeup reel housing 18 from the remainder of the cartridge is readily accomplished.

The photographic film travels in a narrow channel (not shown) within the cartridge. When the exposed film is completely wound on the takeup reel, the line of sight of this narrow channel is below the exposed film. Therefore, the small amount of light that enters through the narrow film channel will not interfere with the exposed film.

FIGS. 4 and 5 show a second embodiment of the cartridge of the invention. Perforations 24 are located in the sidewalls of aperture housing 16 adjacent takeup reel housing 18. Perforations 26 are similarly placed in the top and bottom walls of aperture housing 16. These perforations function to structurally weaken the junction between takeup reel housing 18 and the remainder of the cartridge. Accordingly, separation of takeup reel housing 18 with the takeup reel therein from the remainder of the cartridge can be readily accomplished.

FIGS. 6 and 7 show a third embodiment of the cartridge of the invention. Grooves 28 are located on both sides of aperture housing 16. Grooves 28 are closely positioned to takeup reel housing 18. Grooves 30 are similarly placed along the top and bottom portions of aperture housing 16. It is noted that grooves 28 and 30 extend along the entire side and top and bottom portions of aperture housing 16. This creates a distinct structural weakness that facilitates the separation of takeup reel housing 18 from the remainder of the cartridge.

FIGS. 8 and 9 show a fourth embodiment of the cartridge of the invention. In this embodiment, aperture housing 16 is joined to takeup reel housing 18 by paper wrapper 32. The ripping of paper wrapper 32 will enable takeup reel housing 18 to be separated from the remainder of the cartridge. As shown, paper wrapper 32 extends completely around aperture housing 16. However, it would be possible to construct the cartridge of the invention with the paper wrapper 32 wrapped about only the bottom and sides of aperture housing 16.

FIG. 10 is a perspective view of the cartridge shown in FIGS. 2 and 3. As explained above, slots 20 and 22 provide a structural weakness whereby takeup reel housing 18 may be separated from the remainder of the cartridge. Disposed on the periphery of takeup reel housing 18 are magnetic coating spots 34. These coating spots are used to identify the type of film, i.e., color, etc. If it is not desired to have a magnetic scanner to read magnetic coding spots 34, coated notches which can be visually or manually read may be used.

From the foregoing, it should be apparent that applicant has invented a film cartridge that permits ease of handling and shipping when the film is ready for processing.

The present invention may be embodied in other specific forms without departing from the spirit or essential attributes thereof and, accordingly, reference should be made to the appended claims, rather than to the foregoing specification as indicating the scope of the invention.

I claim:

1. A film cartridge comprising a supply reel housing, a takeup reel housing, and an elongated aperture housing, said supply reel housing and said takeup reel housing being spaced from each other and joined to said aperture housing at opposite ends thereof, said takeup reel housing being joined to said aperture housing by a structurally weak junction, the cross section of said junction comprising substantially less material than the respective cross sections of the immediately adjacent portions of said takeup reel housing and said aperture housing, whereby said takeup reel housing may be readily separated from said aperture housing and said supply reel housing by breaking the material which forms said junction.

2. A film cartridge in accordance with claim 1 wherein the material of said junction is integral with the immediately adjacent portions of said takeup reel housing and said aperture housing.

3. A film cartridge in accordance with claim 2 wherein said junction is defined by a plurality of spaced openings in the material of said junction.

4. A film cartridge in accordance with claim 2 wherein said junction is defined by a plurality of grooves around the periphery of said junction.

5. A film cartridge in accordance with claim 1 wherein said junction comprises no material integral with the immediately adjacent portions of said takeup reel housing and said aperture housing, said immediately adjacent portions being joined by a web fixedly attached to said aperture housing and said takeup reel housing in overlying relation to said junction.

6. A film cartridge assembly comprising a supply reel, a takeup reel, a photographic film, said film extending between said supply and takeup reels, a supply reel housing, a takeup reel housing, and an elongated aperture housing, said supply reel housing and said takeup reel housing being spaced from each other and joined to said aperture housing at opposite ends thereof, said takeup reel housing being joined to said aperture housing by a structurally weak junction, the cross section of said junction comprising substantially less material than the respective cross sections of the immediately adjacent portions of said takeup reel housing and said aperture housing, whereby said takeup reel housing may be readily separated from said aperture housing and said supply reel housing by breaking the material forming said junction when all of said film is wound about said takeup reel.